United States Patent
Enyedy et al.

(10) Patent No.: US 8,338,752 B2
(45) Date of Patent: Dec. 25, 2012

(54) WIRE FEEDER HAVING CHANGEABLE HOUSING

(75) Inventors: Edward A. Enyedy, Eastlake, OH (US); Kenneth L. Justice, Wickliffe, OH (US)

(73) Assignee: Lincoln Global, Inc., City of Industry, CA (US)

( * ) Notice: Subject to any disclaimer, the term of this patent is extended or adjusted under 35 U.S.C. 154(b) by 283 days.

(21) Appl. No.: 11/966,176

(22) Filed: Dec. 28, 2007

(65) Prior Publication Data

US 2009/0166345 A1 Jul. 2, 2009

(51) Int. Cl.
*B23K 9/133* (2006.01)

(52) U.S. Cl. ........... 219/137.2; 219/137 R; 219/137 PS; 228/41; 242/157 R; 226/196.1

(58) Field of Classification Search ............... 219/137.2, 219/137.7, 137.71, 137.9, 136, 72
See application file for complete search history.

(56) References Cited

U.S. PATENT DOCUMENTS

| | | | |
|---|---|---|---|
| 2,833,912 A | | 5/1958 | Royer |
| 3,309,497 A | | 3/1967 | Kensrue |
| 3,632,950 A | | 1/1972 | Berghof |
| 4,665,300 A | | 5/1987 | Bellefleur |
| 4,720,044 A | * | 1/1988 | Stemwedel, Jr. ................ 239/84 |
| 5,406,050 A | | 4/1995 | Macomber et al. |
| 5,831,240 A | * | 11/1998 | Katooka et al. ............ 219/130.1 |
| 5,916,464 A | | 6/1999 | Geiger |
| 6,057,526 A | * | 5/2000 | Lee ............................ 219/145.1 |
| 6,225,596 B1 | | 5/2001 | Chandler et al. |
| 6,390,389 B1 | * | 5/2002 | Tudor et al. .................... 239/290 |
| 6,479,795 B1 | * | 11/2002 | Albrecht et al. ........... 219/137.2 |
| 2006/0018094 A1 | * | 1/2006 | Robbins et al. ............... 361/695 |
| 2006/0081577 A1 | | 4/2006 | Andersen et al. |
| 2007/0075119 A1 | * | 4/2007 | Wong ............................ 228/101 |
| 2008/0083548 A1 | * | 4/2008 | Nakayama et al. ............. 174/50 |

FOREIGN PATENT DOCUMENTS

| | | |
|---|---|---|
| EP | 1022085 A | 7/2000 |
| GB | 901809 A | 7/1962 |
| JP | 5017069 A | 1/1993 |

OTHER PUBLICATIONS

International Search Report dated Apr. 15, 2009.
The Lincoln Electric Company LN-25 PRO Brochure; Jan. 2009; p. 1-4.
The Lincoln Electric Company LN-25 PRO Operator's Manual; IM901-A.; Jun. 2008.
The Power Feed 25M & Power Wave System Brochure; Jun. 2008; pp. 1-12.
The Power Feed 25M & Power Wave System Operator's Manual; IM892-B; Sep. 2008.
SuitCase 8VS and 12VS Brochure; Oct. 2002; Index No. M/6.4.
S-22P12 and Super S-32P Brochure; Dec. 1999; Index No. M/6.3; pp. 1-4.

(Continued)

*Primary Examiner* — Henry Yuen
*Assistant Examiner* — Thien S Tran
(74) *Attorney, Agent, or Firm* — Perkins Coie LLP

(57) ABSTRACT

A modular portable welding wire feeder housed in a easily removable and interchangeable housing. The wire feeder includes a wire feeding module conveniently mounted inside of the housing. The housing is configured so that it may easily be removed from the wire feeing module, thereby allowing the housing to be easily replaced or exchanged as needed by the user.

11 Claims, 3 Drawing Sheets

OTHER PUBLICATIONS

Miller Super S-32P Owner's Manual; OM-1590; Aug. 2001; pp. 1-28.

Miller Super S-22P12 Owner's Manual; OM-1569; Aug. 1998; pp. 1-28.

Miller Super S-32P Owner's Manual; OM-1545E; Nov. 1987; pp. 1-34.

Intl. Preliminary Report on Patentability for counterpart Intl. App. PCT/IB2008/003204 (WO/2009/083765); 6 pgs.; Mar. 9, 2010).

Written Opinion for Intl. App. PCT/IB2008/003204 (WO/2009/083765); 6 pgs.; (posted Jun. 28, 2010 at <http://www.wipo.int/pctdb/en/wo.jsp?WO=2009083765> accessed Feb. 21, 2012).

* cited by examiner

WIRE FEEDER HAVING CHANGEABLE HOUSING

FIELD OF THE INVENTION

The present invention is generally related to a welding wire feeder. More specifically, the present invention relates to a welding wire feeder having a changeable housing.

BACKGROUND OF THE INVENTION

Welding wire feeder systems are commonly integrated with or used in conjunction with an arc welder to feed a wire electrode to a workpiece. Typically, the wire feeder is used in conjunction with a GMAW or FCAW arc welding process. The normal welding environment is a severe test for welding equipment, especially portable wire feeders. Wire feeders are often dropped, bombarded with sparks from grinding, placed on hot welds and used as step stools and props. Over time, this harsh treatment degrades both the appearance and integrity of a wire feeder's exterior housing or case. It would be highly desirable to replace the case of a wire feeder once it degrades, particularly if the wire feeder is owned by a rental agency.

To date, it has generally been difficult to replace a degraded wire feeder case without disassembling the feeder's functional or electrical components.

The described invention allows for a wire feeder capable of accepting more than one housing (also known as a case or a skin). The wire feeder is designed in a manner such that the entire internal wire feeder assembly may be easily removed from one housing and placed into another. The housings may be made of plastic, carbon fiber, sheet metal or a combination thereof, as well as other known materials.

SUMMARY OF THE INVENTION

As stated above, the present invention relates to a wire feeder comprising a wire feeding module, a housing configured to enclose the wire feeding module, and one or more attachment means for attaching the housing to the wire feeding module, wherein the wire feeding module is configured to feed wire independent of the housing, and wherein the housing can be removed from the wire feeder without breaking any electrical connections.

Various embodiments of the present invention will be discussed below.

BRIEF DESCRIPTION OF THE DRAWINGS

The advantages, nature and various additional features of the invention will appear more fully upon consideration of the illustrative embodiments of the invention, which are schematically set forth in the figures, in which.

DETAILED DESCRIPTION OF EXEMPLARY EMBODIMENTS

The welding wire feeder of the present invention allows a user to easily switch between housings on a welding wire feeder. The welding wire feeder has a wire feeding module that operates independently of a welding wire feeder housing. This allows for easy removal of the welding wire feeding module from the housing without breaking any electrical connections and without disassembling functional components of the welding wire feeding module. Accordingly, welding wire feeders made in accordance with the invention disclosed herein allow for the housings of welding wire feeders to be quickly and easily removed and replaced.

Various embodiments of the present invention will be discussed below with reference to FIGS. 1-3 wherein similar elements are given the same reference numbers.

Figure 1:
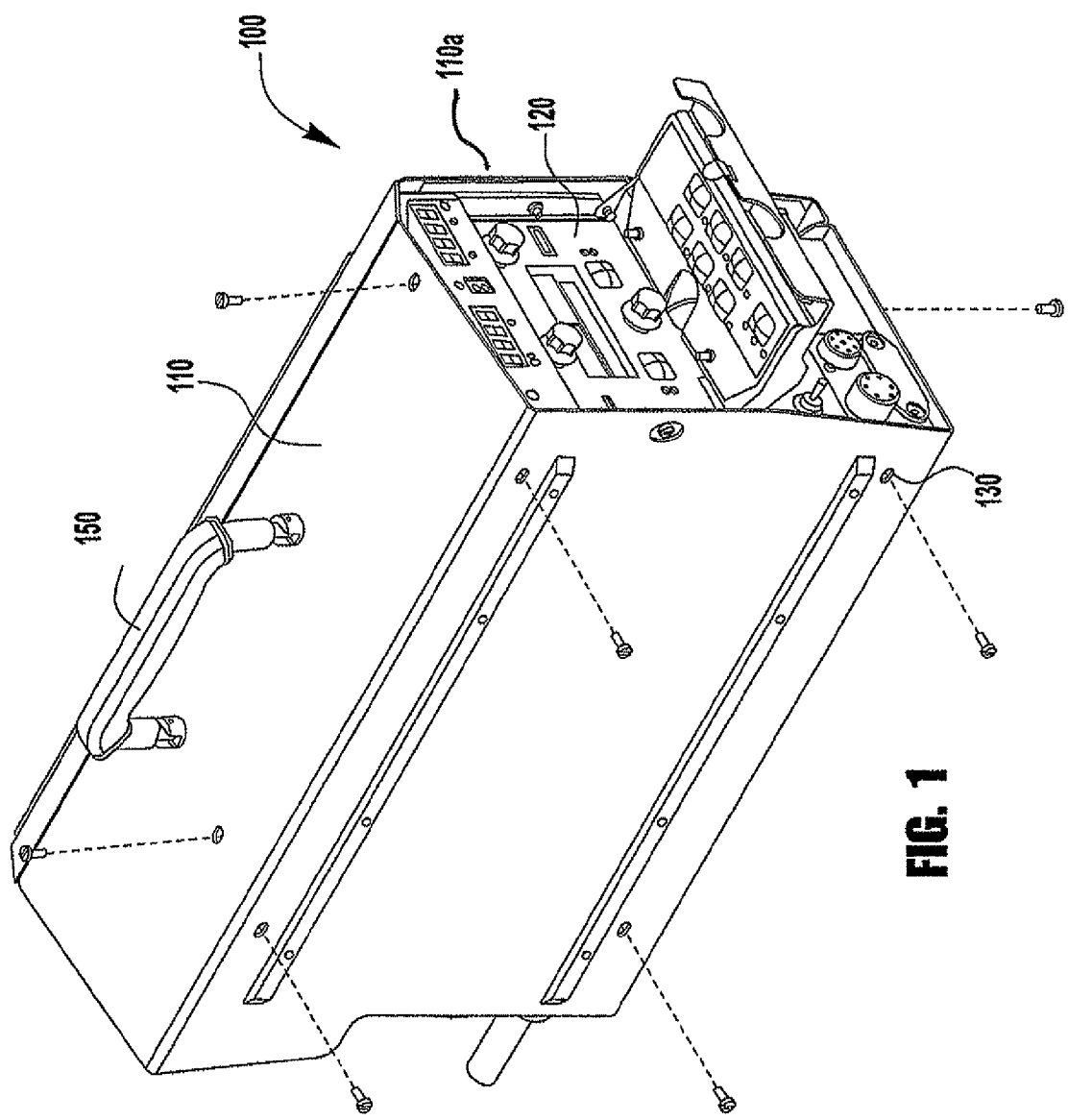
FIG. 1 is a diagrammatical representation of a welding wire feeder according to one exemplary embodiment of the present invention wherein the housing is attached to the wire feeding module.

In the exemplary embodiment illustrated in FIG. 1, a wire feeder 100 includes a wire feeder housing 110, a wire feeding module 120, one or more attachment members 130 for securely attaching wire feeder housing 110 to wire feeding module 120. Wire feeder 100 can also include a carrying handle 150. In this embodiment, housing 110 includes an access panel 110a. Access panel 110a is connected to housing 110 by hinges or other known means to allow access panel 110a to be easily moved, rotated and/or slid to provide access to the functional components of wire feeding module 120 without removing housing 110 in its entirety. While such an access panel may be included, it is not required.

In this embodiment, wire feeding module 120 is a fully functional wire feeder that can be operated without housing 110 being attached thereto. No electrical connections are required to be broken when housing 110 is removed from wire feeding module 120. While it may still be necessary to disconnect a control cable and/or electrode cable when removing the housing, no internal electrical connections inside wire feeding module 120 are required to be broken. Wire feeder 100 is thus able to continue to function even in the absence of wire feeder housing 110. Because housing 110 serves as a protective housing, and not a functional, integral component of wire feeding module 120, housing 110 can be easily removed and replaced without affecting the operation of wire feeding module 120.

When assembled as shown in FIG. 1, housing 110 function as a protective skin covering wire feeding module 120, prevents deleterious materials, e.g., dirt, sparks, water, from coming in contact with wire feeding module 120. Unlike in conventional wire feeders, here, housing 110 is not a functional component of the wire feeder 100, but is instead a protective skin cover the wire feeding module 120.

One or more attachment members 130 attach housing 110 to wire feeding module 120. Attachment members 130 be any type of attachment mechanism that allows secure attachment, e.g., screws, bolts, and pins such as clevis, cotter, or detent ring pins. Other types of attachment mechanisms may, of course, be used.

Figure 2:
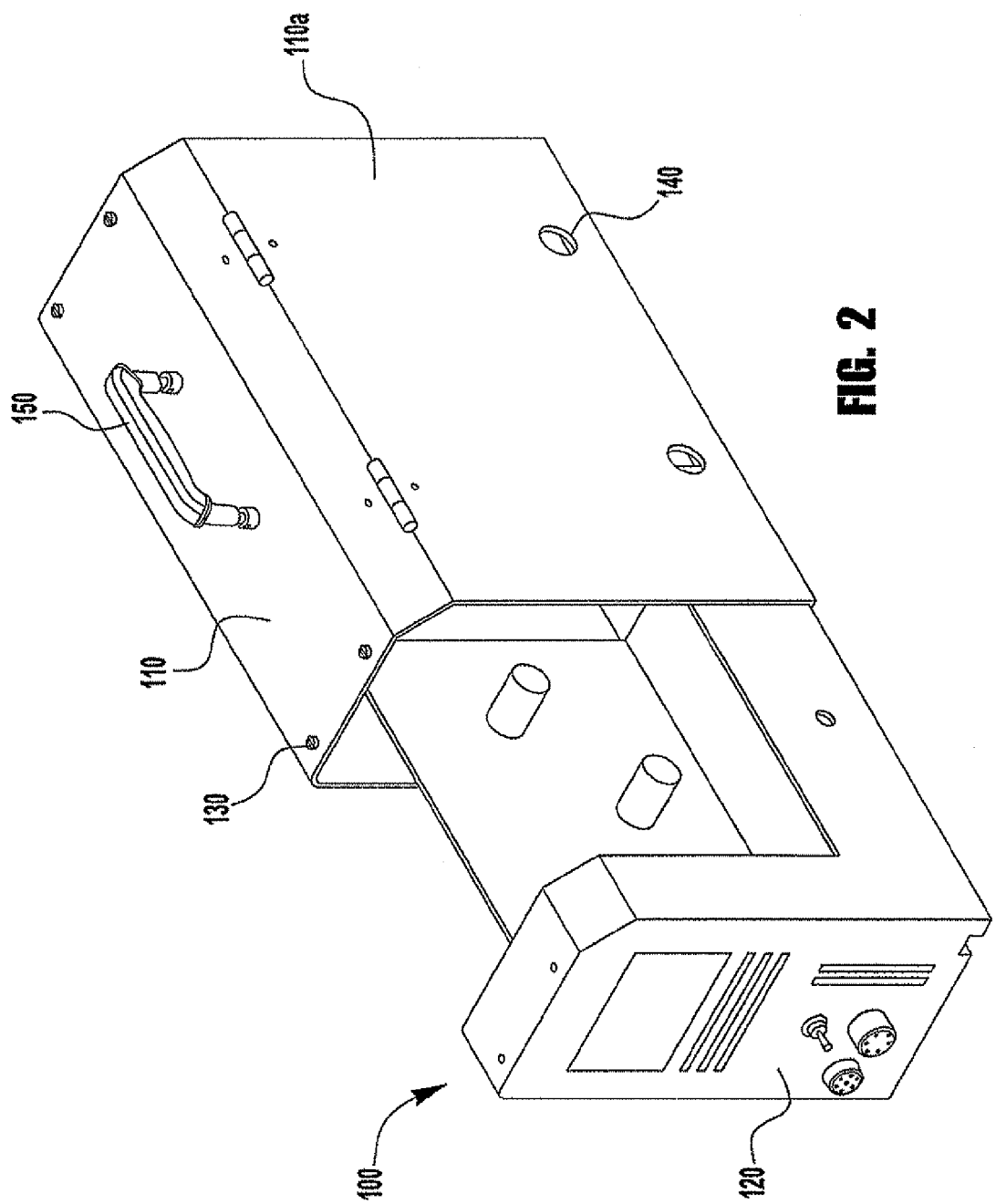
FIG. 2 is a diagrammatical representation of a welding wire feeder wherein according to a second exemplary embodiment of the present invention wherein the wire feeding module is being removed from the housing.
Figure 3:
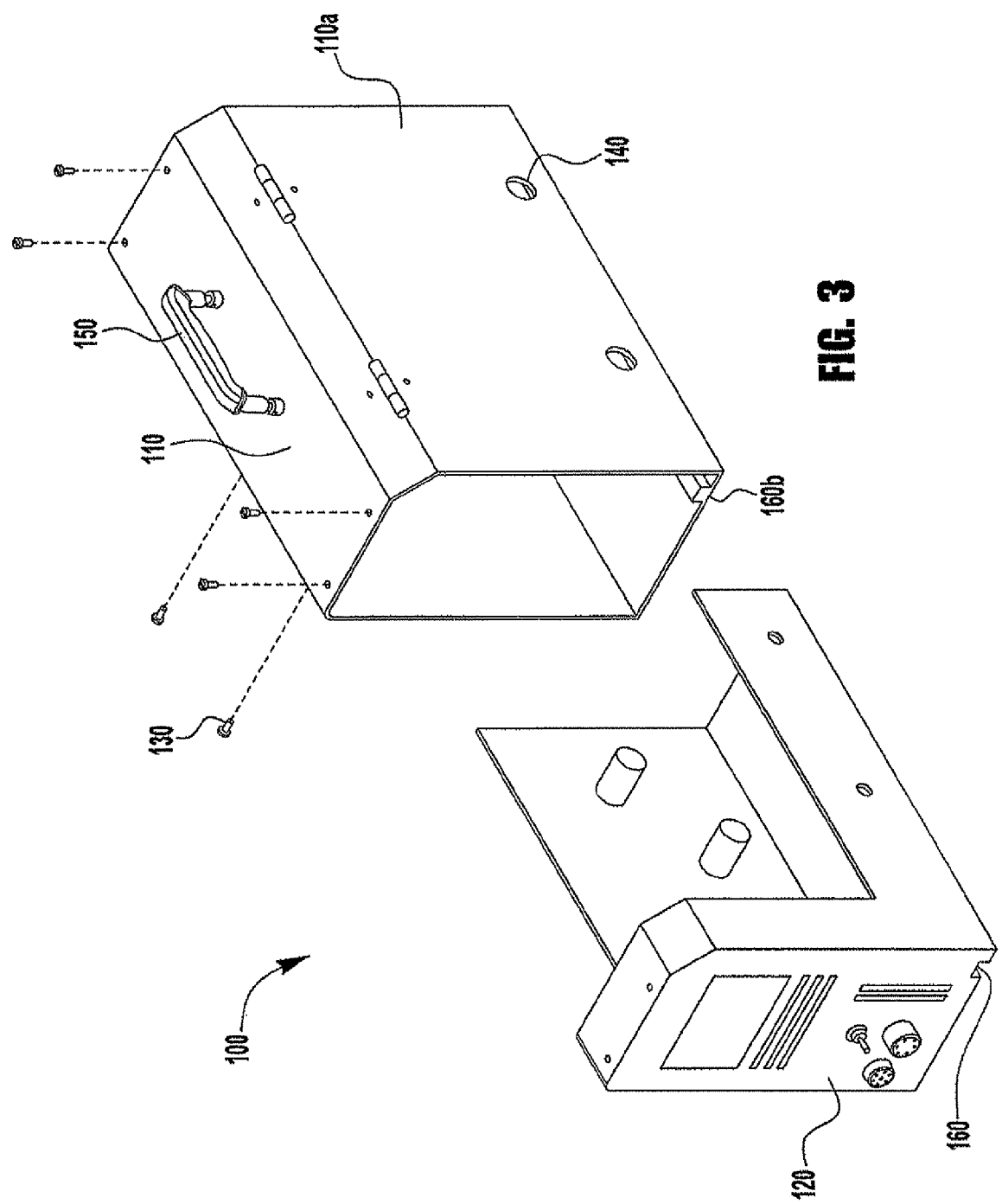
FIG. 3 is a diagrammatical representation of a welding wire feeder wherein according to the second exemplary embodiment of the present invention wherein the wire feeding module has been removed from the housing.

As shown in FIGS. 2-3, a wire feeder 100 can also include a carrying handle 150 and access panel handles 140. Carrying handle 150 allows a user to transport wire feeder 100 from location to location as needed. Access panel handles 140 provide a means to open access panel 110a to gain access to wire feeding module 120 while housing 110 is attached to wire feeding module 120.

Wire feeing module 120 may also include an assembly guide 160a, and housing 110 may also include an assembly guide 160b. Here, assembly guide 160b is a raised notch on the interior surface of housing 110 that aligns with an assembly guide 160a, shown in FIGS. 2-3 as a notch on wire feeding module 120. Other known means can be employed to ensure proper alignment and/or orientation of the wire feeding module 120 with the housing 110.

Of course, it is contemplated wire feeder 100 can be configured in any way such that the spirit of the invention is maintained, and the invention is not limited to the exemplary embodiment discussed above.

The present invention has been described with certain embodiments and applications. These can be combined and interchanged without departing from the scope of the invention as defined in the appended claims. Namely, the present invention can be used in any application in which an easily removable housing is desirable, such as a welding or cutting power source. The invention as defined in these appended claims is incorporated by reference herein as if part of the description of the novel features of the present invention.

We claim:

1. A welding wire feeder having an assembled configuration and a removed configuration, the feeder comprising:
   a wire feeding module to feed a wire in conjunction with a welding process, the wire feeding module having a first assembly guide;
   a housing having a first end and a second end, the housing including a base panel, a top panel and at least two opposed side panels disposed about the wire feeding module in the assembled configuration such that each of the panels define a perimeter edge of an opening at one of the first and second ends of the housing, each of the base panel, top panel and at least two side panels provide an inner surface of the housing, the at least two side panels include an access panel movably attached to the housing, the inner surface including a second assembly guide for engaging the first assembly guide in the assembled configuration,
   wherein the first assembly guide includes a base portion of the wire feeding module having a recess, and wherein the second assembly guide includes the base panel of the housing, the base panel including a raised notch along the inner surface for engaging the recess of the base portion of the wire feeding module to insert and remove the wire feeding module through the opening in the removed configuration; and
   one or more attachment means for attaching the housing to the wire feeding module,
   wherein in the removed configuration, the wire feeding module is configured to feed wire independent of the housing such that the housing is not a functional component of the wire feeding module.

2. The welding wire feeder according to claim 1, wherein the guide is configured to engage the notch such that incorrect assembly of the housing to the wire feeding module is prevented.

3. A welding device comprising:
   a welding device module configured to function in connection with a welding process, the module having internal electrical components which provide for the fully functional operation of the welding device module, the welding device module including a first assembly guide;
   a housing substantially enclosing the welding device module having a first end and a second end, the housing including a bottom panel, a top panel and at least two side panels to define an inner surface of the housing, the at least two side panels including an access panel movably attached to the housing, the inner surface including a second assembly guide along the bottom panel for engaging the first assembly guide, the bottom, top and at least two side panels each defining a perimeter of an opening located at at least one of the first and second ends of the housing for removal of the device module through the opening; and
   one or more attachment means for attaching the housing to the module, the attachment means being removable for removing the module from the housing,
   wherein the first assembly guide includes a base portion of the welding device module having a first notch, and wherein the second assembly guide includes a second notch along the inner surface of the bottom panel for engaging the first notch of the base portion of the welding device module, one of the first and second notch being recessed and the other of the first and second notch being raised for engagement with the recessed notch to insert and remove the welding device module from the housing,
   wherein the welding device module is configured to operate independent of the housing, with the housing not being a functional component of the welding device module, such that the welding device module is fully functional with no internal electrical connections required to be broken upon removal of the welding device module from the housing.

4. The device according to claim 3, wherein the first assembly guide is configured to engage the second assembly guide such that incorrect assembly of the housing to the welding device module is prevented.

5. A welding wire feeder having an assembled configuration and a remove configuration, the welding wire feeder comprising:
   a wire feeding module to feed a wire in conjunction with a welding process, the wire feeding module halving a base portion including a first guide element defining a recess in the base portion, the wire feeding module having a front face including a control panel; and
   a housing having a first end, a second end, a top panel, a bottom panel opposite the top panel, at least two side panels including an access panel movably attached to the housing to define an enclosure having an opening at one of the first and second ends of the housing in the shape of the front face of the module, the housing having an inner surface including a second guide element defining a raised portion disposed along the bottom panel configured to engage the recess in the base portion of the wire feeding module so as to at least one of orient align the wire feeding module relative to the housing for insertion and removal of the wire feeding module through the opening to respectively define the assembled and removed configurations, the housing being selectable from a plurality of materials,
   wherein in the assembled configuration, the wire feeding module is disposed through the opening such that said front face of said module closes said opening to enclose said module in said housing, and
   wherein in the removed configuration, the wire feeding module is removed through the opening and the wire feeding module is fully functional.

6. The welding wire feeder according to claim 5, wherein the housing is selectable from a plurality of colors and shapes.

7. A welding wire feeder assembly having an assembled configuration and a removed configuration, the welding wire feeder comprising:
   a wire feeding module to feed a wire in conjunction with a welding process, the wire feeding module having a base portion having a bottom surface including a notch, said base portion defining a width and a length of said module, said module having a first end and a second end spaced apart from one another by the length of said module, said first end of the module including a operating panel for operating said module;

a housing including a plurality of interconnected panels to define an enclosure with an inner surface and an opening at one end of the enclosure, the plurality of panels including a side panel having an access panel movably attached to the housing and a base panel engaged with the bottom surface of the base portion of the wire feeding module;

a guide disposed along said base panel for engaging said notch for insertion and removal of said module through said opening of the housing in the direction of the length to respectively define said assembled and removed configurations, wherein said assembled configuration, said welding wire module is inserted through said opening such that said notch of base portion engages said guide of said base panel and said first end closes said opening, wherein said guide includes a raised notch along the inner surface of said base panel, and the notch of the wire feeding module comprises a recessed notch along the bottom surface of the base portion of said wire feeding module.

8. The assembly of claim 7, wherein in the assembled configuration said raised notch and recessed notch are fully engaged with one another with the operating panel of said module disposed in the opening.

9. The assembly of claim 7, wherein further in said removed configuration, said wire module is fully functional.

10. A method of operating a welding wire feeder, the method comprising:
  providing a wire feeding module to feed a wire in conjunction with a welding process, said wire feeding module having a front face with an operating panel disposed on said front face and base portion having a recess to define a first assembly guide;
  inserting said wire feeding module in a housing having a top panel, a bottom panel opposite the top panel, and at least two opposed side panels including an access panel disposed about said wire feeding module in an assembled configuration such that each of the panels define a inner surface of the housing and define a perimeter edge of an opening at one of a first end and a second end of the housing, said inner surface including a raised assembly guide along said bottom panel, said second assembly guide including a raised notch, wherein said front face closes said opening of said housing and wherein during said inserting, said recessed notch of said first assembly guide along said base portion of said wire feeding module engages said raised notch of said second assembly guide of said housing to guide said wire feeding module into said housing; and
  removing said wire feeding module from said housing through said opening,
  wherein upon removal of said wire feeding module from said housing said wire feeding module is fully functional.

11. The method of claim 10, wherein no internal electrical components are broken during said removal step.

* * * * *